United States Patent [19]

Bradley et al.

[11] 3,926,344

[45] Dec. 16, 1975

[54] VOLUMETRIC DISPENSER FOR SMALL PARTICLES FROM PLURAL SOURCES

[75] Inventors: Ronnie A. Bradley, Oak Ridge; William H. Miller; John D. Sease, both of Knoxville, all of Tenn.

[73] Assignee: The United States of America as represented by the United States Energy Research and Development Administration, Washington, D.C.

[22] Filed: June 20, 1974

[21] Appl. No.: 481,422

[52] U.S. Cl. ................ 222/145; 222/429; 222/439
[51] Int. Cl.² ........................................ G01F 11/28
[58] Field of Search ......... 222/49, 50, 47, 145, 426, 222/428, 429, 430, 438, 439, 450

[56] References Cited
UNITED STATES PATENTS

| | | | |
|---|---|---|---|
| 469,992 | 3/1892 | Cox | 222/439 X |
| 874,560 | 12/1907 | Berg | 222/485 X |
| 1,139,269 | 5/1915 | Goodman | 222/439 X |
| 3,262,610 | 7/1966 | Jordan | 222/450 X |
| 3,788,370 | 1/1974 | Hare et al. | 222/429 X |

*Primary Examiner*—Robert B. Reeves
*Assistant Examiner*—Francis J. Bartuska
*Attorney, Agent, or Firm*—Dean E. Carlson; David S. Zachry; Stephen D. Hamel

[57] ABSTRACT

Apparatus is described for rapidly and accurately dispensing measured volumes of small particles from a supply hopper. The apparatus includes an adjustable, vertically oriented measuring tube and orifice member defining the volume to be dispensed, a ball plug valve for selectively closing the bottom end of the orifice member, and a compression valve for selectively closing the top end of the measuring tube. A supply hopper is disposed above and in gravity flow communication with the measuring tube. Properly sequenced opening and closing of the two valves provides accurate volumetric discharge through the ball plug valve. A dispensing system is described wherein several appropriately sized measuring tubes, orifice members, and associated valves are arranged to operate contemporaneously to facilitate blending of different particles.

1 Claim, 4 Drawing Figures

3,926,344

VOLUMETRIC DISPENSER FOR SMALL PARTICLES FROM PLURAL SOURCES

BACKGROUND OF THE INVENTION

The invention described herein relates generally to volumetric dispensers and more particularly to a volumetric dispenser for small spherical or spheroidal particles such as the coated nuclear fuel particles used in the manufacture of bonded-particle carbon-matrix nuclear fuel composites. It was made in the course of, or under, a contract with the U.S. Atomic Energy Commission.

Particulate nuclear fuels have been widely investigated for use in high-temperature gas-cooled reactors. Generally, individual fuel particles comprise a central core of fissile or fertile material surrounded by one or more layers of refractory material, such as pyrolytic carbon, silicon carbide, etc., which serve as an outer, protective, gas-impermeable coating. Individual fuel particles are about the size of grains of common table salt. One such coated fuel particle, commonly referred to as a duplex-coated particle, consists of a dense actinide oxide core, a first highly porous, pyrolytic carbon coating, and an outer gas-impermeable, protective coating of high density, isotropic, pyrolytic carbon. Another coated fuel particle described in U.S. Pat. No. 3,298,921, issued to Jack C. Borkos on Jan. 17, 1967, for "Pyrolytic Carbon Coated Particles for Nuclear Applications," comprised a central fuel core surrounded by a single protective coating of isotropic carbon.

Of recent interest is the incorporation or consolidation of such coated fuel particles into a carbon-containing matrix fuel composite useful, for example, in a high-temperature gas-cooled reactor such as the Fort St. Vrain reactor designed by General Atomic Company for the Public Services Corporation of Colorado. That particular reactor has a graphite core comprised of about 1400 fuel elements. Each fuel element contains approximately 210 elongated fuel cavities which are loaded with coated-particle carbonized-matrix fuel composites commonly referred to as fuel sticks or fuel rods.

Depending upon the size of fuel stick used, it is presently contemplated that a single large (1000 MWE) high-temperature gas-cooled reactor will require a loading of from four to ten million fuel sticks. In normal operation about one-fourth of the fuel sticks will be replaced each year. Assuming that 50 such reactors are built, hundreds of millions of fuel sticks meeting stringent nuclear standards will have to be fabricated. Fuel recycle will complicate this massive fabrication need by adding a remote operation requirement since the recycled fuel will be more highly radioactive.

Another complication occurs due to the mixture of different particles required in each fuel stick. Present plans call for three different kinds of particles to be loaded in each fuel stick: particles containing fissile material, particles containing fuel material, and shim particles which are unloaded carbon blanks used to regulate the fuel concentration in the fuel stick. Each particle type must be accurately dispensed and blended in each fuel stick to ensure satisfactory nuclear performance.

It is, accordingly, a general object of the invention to provide apparatus for rapidly and accurately dispensing measured volumes of small particles.

Another object of the invention is to provide apparatus for rapidly and accurately dispensing measured volumes of small particles wherein the apparatus is amenable to remote operation as in a hot cell.

Other objects of the invention will be apparent to those skilled in the art upon examination of the following description of the preferred embodiment and appended drawings.

SUMMARY OF THE INVENTION

In accordance with the invention, apparatus is provided for rapidly and accurately dispensing measured volumes of particulate material from one or more supply hoppers. Each individual dispensing apparatus includes an adjustable, vertically oriented measuring tube and orifice member defining the volume of particulates to be dispensed, a ball plug valve for selectively closing the bottom end of the orifice member, and a compression valve for selectively closing the top end of the measuring tube. The supply hopper is disposed above and in gravity flow communication with the tube. Properly sequenced opening and closing of the two valves provides accurate volumetric discharge through the ball plug valve. A plurality of appropriately sized measuring tubes, orifice members, and associated valves may be arranged to operate contemporaneously to simultaneously dispense measured volumes of different particles. Such operation is useful in achieving controlled blending of several different particles.

DESCRIPTION OF THE PREFERRED EMBODIMENT

Figure 1:
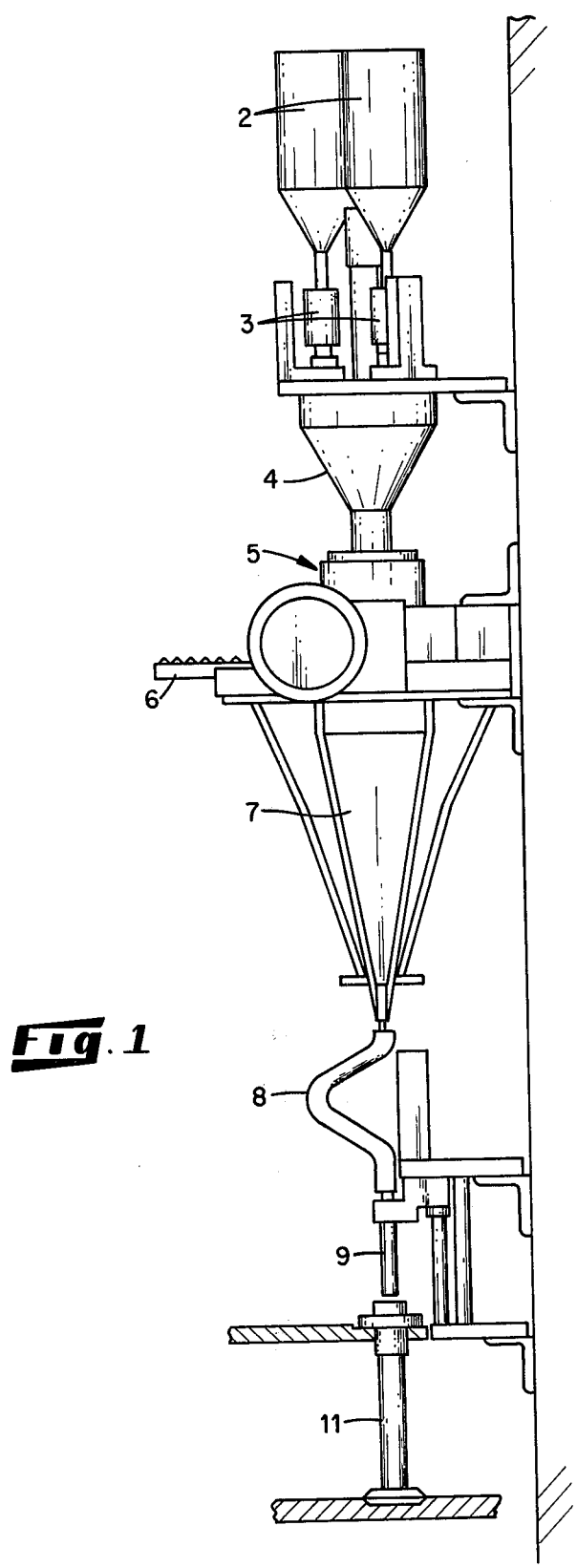
FIG. 1 is a schematic front elevation view of an automatic multistation particle loading system using particle dispensing apparatus made in accordance with the invention.

Referring now to the drawings, initially to FIG. 1, an automatic particle dispensing and blending system using multistation dispensing apparatus made in accordance with the invention is shown in a schematic front elevation view. Particulate materials to be dispensed and blended are stored in supply hoppers 2 with one hopper being provided for each type of particulate material. Adjustable volumetric dispensers 3 made in accordance with the invention simultaneously dispense measured volumes of particulate material from the respective supply hoppers into funnel 4. Partial blending occurs as the respective particles pass through the funnel into a volume splitter and blender 5 which is described in detail in copending application of common assignee Ser. No. 491,096 now U.S. Pat. No. 3,901,409. Sub-volumes of blended particulates are retained in volume splitter and blender 5 until the dispensing operation is completed and then sequentially discharged through the action of slide valve 6 disposed immediately below volume splitter and blender 5. The sub-volumes are discharged into a funnel 7 which is connected, by means of delivery tube 8, with fill tube 9. Fill tube 9, shown in its non-filling or "up" position, is normally fully lowered into a fuel rod mold 11 during a filling operation. The fill tube is made retractable to facilitate rapid removal and replacement of fuel rod mold 11 as might be required where a plurality of molds are mounted on a turntable and sequentially loaded using a turntable indexing mechanism. Following the particulate loading operation, the loaded fuel rod mold may be moved to an infiltration station for the injection of carbonaceous filler material in accordance with prior-art procedures.

Figure 2:
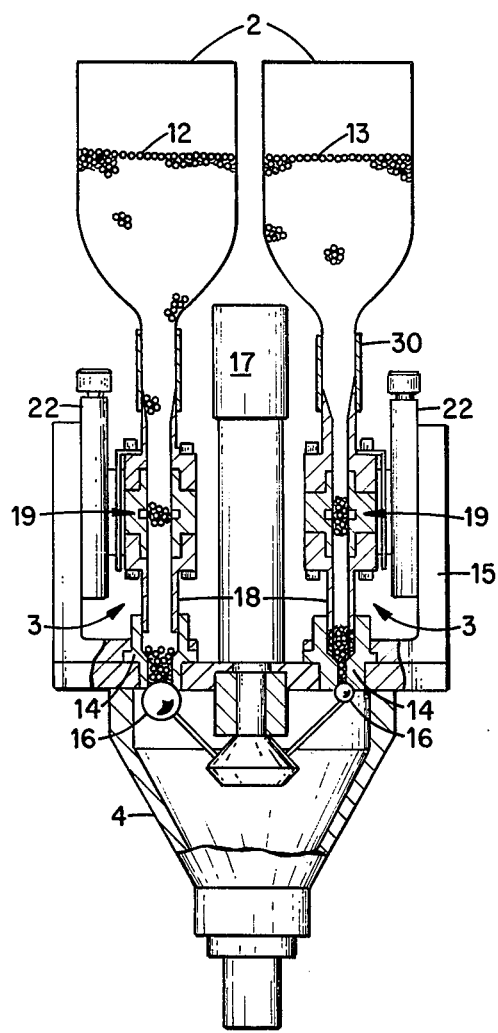
FIG. 2 is a vertical section view of multistation particle dispensing apparatus made in accordance with the invention shown in a loading mode.
Figure 3:
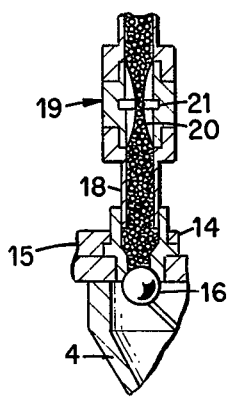
FIG. 3 is a partial view of the apparatus of FIG. 2 illustrating the manner in which particulate flow from the supply hopper is halted.
Figure 4:
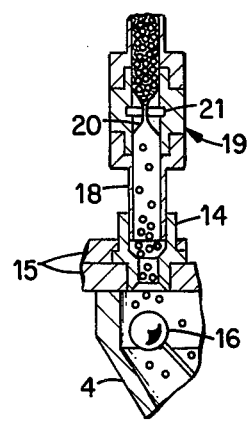
FIG. 4 is a partial view of the apparatus of FIG. 2 illustrating the manner in which a measured volume of particles is dispensed therefrom.

Turning now to FIG. 2, two volumetric dispensers 3 made according to the present invention are arranged to simultaneously dispense particulate material 12 and 13 from respective supply hoppers 2. The reference numerals are used to designate like or corresponding parts of the two dispensers 3 since they are identical except for size. Each dispenser includes an orifice member 14 supported within a frame 15 and selectively closed at its lower discharge port end by means of a ball plug valve 16. As shown, ball plug valve 16 is selectively opened and closed by means of a central pneumatically driven piston-cylinder assembly 17. Simultaneous opening and closure of both orifice members 14 is effected by the single piston-cylinder assembly for reasons which will be discussed below. Extending upward from each orifice member 14 is a vertically adjustable volumetric measuring tube 18 having a lower end slidably engaged within a passageway extending through the orifice member. Positioned atop the measuring tube is a pneumatically operated compression valve 19 comprising a deformable elastomer tubing segment 20 (see FIGS. 3 and 4) disposed within a housing defining an annular groove 21 surrounding the tubing for applying pneumatic pressure which deforms the tubing to close the valve. Tubing segment 20 may be formed by any suitable elastomer such as latex, Viton, Buna N, silicone rubber, or polyurethane, with each having a hardness of approximately durometer 20. Connected to the top of each compression valve and in gravimetric flow communication with coupling 30 is a supply hopper 2 holding a load of particulate material.

Each assembly of supply hopper 2, compression valve 19, and measuring tube 18 is vertically adjustable relative to frame 15 and orifice member 14 by means of a micrometer slide 22. Vertical adjustment of measuring tube 18 causes its lower end to slide within a corresponding orifice member 14 thereby changing the measured volume of particulates dispensed upon the opening of ball plug valve 16. A rough approximation of the volume to be discharged from each dispenser 3 is first made by selecting a measuring tube 18 having a length and internal diameter roughly defining the volume of interest. Fine adjustment of the volume is then made by appropriate movement of micrometer slide 22. The inside diameter of measuring tube 18 must be at least eight times greater than the mean diameter of the particulate material for best results.

Ball valve 16 is normally biased in the closed position as shown in FIG. 2 by any suitable means such as a compression spring disposed within piston-cylinder assembly 17. Opening of valve 16 by applying pneumatic pressure to piston-cylinder assembly 17 dispenses a measured volume of particulates from the dispensing apparatus into a funnel 4 which may be used to direct the particulates into a volume splitter and blender as shown in FIG. 1 or into any suitable receiver.

During a normal operation of volumetric dispensers made in accordance with the invention, ball plug valve 16 is closed and compression valves 19 opened to permit particulate material to flow from hoppers 2 into respective measuring tubes 18 in the manner illustrated in FIG. 2. Each compression valve 19 is then closed by pressurizing the annular groove 21 to close or compress elastomer tubing segment 20, as illustrated in the enlarged partial view of FIG. 3. Ball plug valve 16 is then opened by pneumatically actuating piston-cylinder assembly 17 and the contents of the respective measuring tubes simultaneously gravimetrically dispensed through orifice members 14. The dispensing operation is illustrated in the enlarged partial view of FIG. 4. Ball plug valve 16 is then returned to the position shown in FIG. 2 and compression valves 19 opened to repeat the loading and dispensing cycle. Total cycle times of from two to four seconds have been achieved.

Compression valves made with elastomer tubing having a uniform wall thickness and with tubing containing thinned wall sections were evaluated for volume-measuring accuracy by dispensing at least 100 approximately 1.5-gram samples of 420–500 $\mu$m particles and then weighing the dispensed samples. The standard deviation for the 100 samples ranged from 0.003 to 0.005 gram. For the compression valve with a curved thin section in the latex tubing wall, the tolerance limits achieved indicated with a 99% probability that 99% of the samples dispensed will be within ±0.7% of the mean sample weight. Larger sample volumes should provide even greater accuracy.

As indicated above, several types of carbon-coated spherical particles are currently used in the preparation of fuel rods for high-temperature gas-cooled nuclear reactors. Accordingly, for the fabrication of such fuel rods, a dispenser for each type of fuel particle is utilized. Each dispenser is attached to a common frame element whereby all may be operated simultaneously for enhanced mixing of the particles. Each dispenser is designed, through appropriate sizing of the discharge ports in orifice members 14, to discharge contemporaneously so that the dispensing operation is started and completed at the same time for all dispensers. Concurrent operation of all dispensers is necessary to ensure uniform mixing of the respective particles.

The above description of one embodiment of the invention is offered for illustrative purposes only and should not be interpreted in a limiting sense. For example, more or less than the two volumetric dispensers illustrated could be attached to a common frame and operated in parallel. Also, dispensers made in accordance with the invention are not restricted to dispensing coated nuclear fuel particles but are also useful in other unrelated areas of technology such as pharmaceutical packaging. It is intended, rather, that the invention be limited only by the scope of the appended claims.

What is claimed is:

1. Apparatus for accurately and contemporaneously dispensing measured volumes of a plurality of different small spherical or spheroidal particles from respective supply hoppers into a common receiver comprising:

a. a support frame;
   b. a plurality of orifice members defining vertically oriented passageways mounted within and supported by said frame, said passageways terminating in respective discharge ports at the lower ends of said orifice members;

c. ball plug valves respectively engaging said discharge ports;
d. means for simultaneously actuating said ball plug valves to simultaneously open and close said discharge ports;
e. vertically oriented, vertically individually adjustable measuring tubes having lower ends respectively slidably engaging said passageways in said orifice members; said measuring tubes and passageways respectively defining dispensing volumes for said different particles; said discharge ports being sized to contemporaneously discharge the respective particle contents of said measuring tubes and passageways;
f. pneumatically actuated compression valves respectively disposed immediately above and in flow communication with said measuring tubes for selectively admitting said different particles into said tubes and said passageways; and
g. means for respectively permitting gravity transfer of said different particles from said supply hoppers to the upstream sides of said compression valves.

* * * * *